(12) United States Patent
van Vugt

(10) Patent No.: US 12,072,260 B2
(45) Date of Patent: Aug. 27, 2024

(54) DEVICE FOR MONITORING AN EQUIPMENT

(71) Applicant: Aktiebolaget SKF, Gothenburg (SE)

(72) Inventor: Lambert van Vugt, Media, PA (US)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 17/173,303

(22) Filed: Feb. 11, 2021

(65) Prior Publication Data

US 2021/0310899 A1    Oct. 7, 2021

(30) Foreign Application Priority Data

Apr. 1, 2020    (DE) .......................... 102020204227.6

(51) Int. Cl.
*G01M 13/00*    (2019.01)

(52) U.S. Cl.
CPC .................................... *G01M 13/00* (2013.01)

(58) Field of Classification Search
None
See application file for complete search history.

(56) References Cited

U.S. PATENT DOCUMENTS

| | | | | |
|---|---|---|---|---|
| 5,430,690 A * | 7/1995 | Abel | ...................... | G01R 23/16 367/136 |
| 5,698,788 A | 12/1997 | Mol et al. | | |
| 9,772,219 B2 * | 9/2017 | Hedin | .................. | G01M 13/045 |
| 10,387,445 B2 * | 8/2019 | Limonad | .................. | G06F 16/26 |
| 2008/0015821 A1 * | 1/2008 | Roushall | ............. | H01J 49/0036 702/191 |
| 2012/0080008 A1 * | 4/2012 | Matsushima | ........... | F02P 5/152 123/436 |
| 2017/0356936 A1 * | 12/2017 | Ismail | ................. | G01R 19/0053 |
| 2017/0363072 A1 * | 12/2017 | Son | .......................... | G01M 7/00 |
| 2019/0064034 A1 * | 2/2019 | Fayfield | ................. | G01M 15/12 |

FOREIGN PATENT DOCUMENTS

EP    0718608 A1    6/1996

OTHER PUBLICATIONS

Jong-Myon Kim, Automated Bearing Fault Diagnosis Using 2D Analysis of Vibration Acceleration Signals under Variable Speed Conditions, School of Electrical, Electronics and Computer Engineering, University of Ulsan, Building No. 7, Room No. 308, 93 Daehak-ro, Nam-gu, Ulsan 680-749, Republic of Korea (Year: 2016).*

* cited by examiner

*Primary Examiner* — Matthew G Marini
(74) *Attorney, Agent, or Firm* — GARCIA-ZAMOR INTELLECTUAL PROPERTY LAW, LLC; Ruy Garcia-Zamor

(57) ABSTRACT

Disclosed is a device for monitoring an equipment, the device providing a receiving unit for receiving an input signal from a sensor of the equipment, the input signal being a noisy two-dimensional full bandwidth signal. The device includes a processing unit for normalizing the input signal, for averaging and thresholding the normalized input signal and for providing the averaged and thresholded signal as a filtered output signal being usable for monitoring the equipment. Also, a method for monitoring an equipment with the device is disclosed.

20 Claims, 2 Drawing Sheets

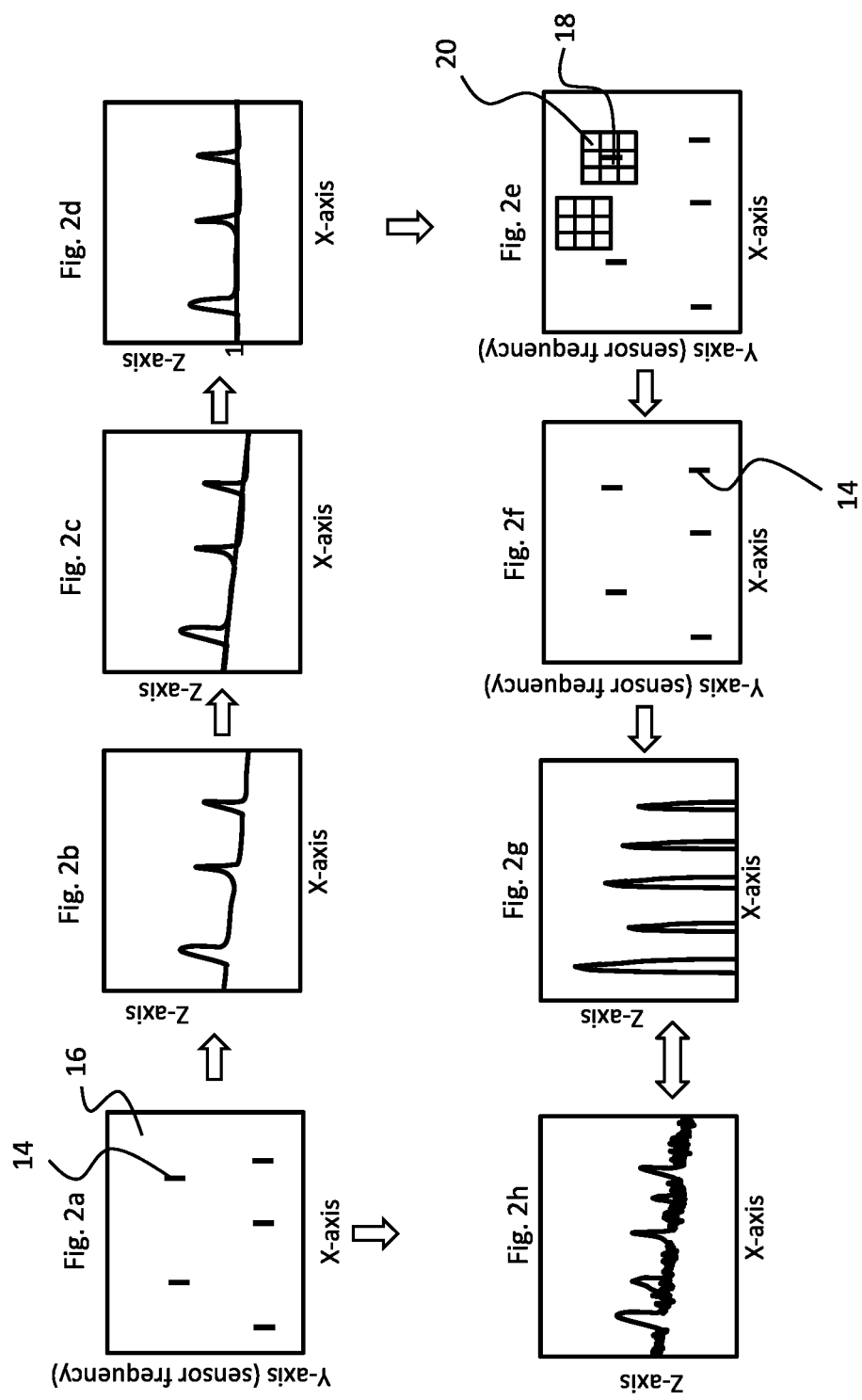

DEVICE FOR MONITORING AN EQUIPMENT

CROSS-REFERENCE TO RELATED APPLICATIONS

This application claims priority to German Patent Application no. 102020204227.6, filed Apr. 1, 2020, the contents of which is fully incorporated herein by reference.

TECHNICAL FIELD OF THE INVENTION

The present invention relates to a device for monitoring having a receiving unit for receiving an input signal from a sensor of the equipment and a processing unit for normalizing the input signal.

BACKGROUND OF THE INVENTION

In condition monitoring of equipment, for example industrial equipment, sensor signals often consist of impulses in the time or frequency domains. It is a priori not known at which frequency(s) a condition related phenomenon occurs. Further, the source-sensor transfer function is also strongly frequency dependent. Thus, there is a strong frequency dependence of the signal-to-noise ratio (SNR) of the sensor signal which can drastically differ from machine to machine, or even from acquisition to acquisition. In particular, the lack of knowledge about the correct frequencies, i.e. the frequencies at which a condition related phenomenon occurs, may cause a reduced detection sensitivity due to either reducing the signal by not detecting at the right frequency and/or increasing the noise by detecting a wider frequency bandwidth than necessary, which will also introduce more noise.

In particular, in known systems, it is tried to solve this by either using fixed detection frequency bands, resulting in a non-optimal SNR, or by an extensive manual intervention to set optimal detection bands. Both approaches are not suitable for an automatic and scaleable detection and diagnosis of sensor signals. It is therefore object of the present invention, to provide an improved way of monitoring an equipment based on sensor signals.

SUMMARY OF THE INVENTION

The device for monitoring an equipment comprises a receiving unit for receiving an input signal from a sensor of the equipment.

The sensor may be any kind of frequency detecting sensor, for example an acceleration, velocity, displacement, load or electromagnetic radiation sensor. The equipment may also be any kind of, in particular industrial, equipment, for example machines containing bearings.

The input signal from the sensor is a noisy two-dimensional broad bandwidth signal, in particular a noisy two-dimensional full bandwidth signal. This means that the input signal is a signal containing multiple frequencies for each point of time. The second dimension may contain for instance the quantity of time, space, phase, complex phase angle, speed, temperature, magnitude, frequency, order or repetition frequency and may be obtained by operations on the (sliding windowed) 1D signal such as for instance a Fourier transform, wavelet transform, Hilbert transform, singular value decomposition, (non)-linear filtering, binning as well as machine learning methods such as for instance clustering, auto encoding and decoding, regression, classification, neural networks.

In order to improve the monitoring of equipment, in particular by optimizing the signal-to-noise ratio, the device comprises a processing unit for processing the input signal. The processing of the input signal comprises normalizing the input signal, averaging and thresholding the normalized input signal in order to reduce noise and providing the averaged and thresholded signal as a filtered output signal. In particular, by averaging and thresholding the normalized input signal, the distinction between signal and noise may be sharpened as the noise in the averaged and thresholded signal is eliminated or at least reduced. This may allow inter alia an automatic detection of impulses and peaks at specific detection frequencies for example frequencies being related to defects of the equipment or other sources of signal impulses/peaks such as drives and motors as well as neighboring equipment. Such an automatic detection does not require any manual interpretation by a user.

The input signal comprises multiple frequencies, as explained above, in a first dimension as well as a second dimension containing for instance the quantity of time, space, phase, phase angle, speed, temperature, magnitude, frequency, order or repetition frequency. In order to normalize the input signal, the processing unit is adapted to process each frequency independently and to normalize the input signal for each frequency.

The normalization of the input signal can be carried out by low pass filtering, for example median filtering or averaging, the input signal for each frequency independently over a moving window in the second dimension, for example using a window size at least the width of the signal peak widths. After this filtering step, the processing unit is adapted to normalize for each frequency the signal by dividing the signal by the low pass filtered signal. This means that the input signal is normalized to frequency by frequency. Instead of averaging or median filtering, also other normalization operations may be used such as linear smoothing filters formed by low pass-filters such as convolution with a Gaussian kernel, anisotropic diffusion filters, non-local averaging filters, non-linear rank-conditioned rank-selection filters (such as median filters), wavelet transform filters, statistical method filtering, block matching filtering, random field filtering, as well as filtering by machine learning methods such as artificial and deep neural networks.

After the normalization, which is done for each frequency independently, the normalized full bandwidth signal is spatially low pass filtered (averaged) and thresholded. For that, the processing unit is adapted to calculate the average value of one data point of the normalized input signal, which is in the form of a two-dimensional matrix, and of a predefined number of neighbor data points of the one data point and to calculate a new value of the one data point based on the average value. This means that each data point of the two-dimensional matrix is averaged and thresholded to get a new value.

The calculation of the average value may be either based on a median filtering of the data points or on a calculation of a mean value of the data points or on any of the above-mentioned filtering methods.

In particular, the new value may be set to zero if the average value is below a predefined threshold value. Further, the new value may remain the current value if the average value is above or equal to the predefined threshold value. The predefined threshold value may be defined for example according to statistical information. The threshold may be set for example to a value representing a statistical threshold for noise, in particular for the actual monitored equipment. By averaging and thresholding the normalized input signal, the distinction between signal and noise may be sharpened and thus the overall quality of the input signal may be improved. This may enhance the monitoring of the equipment. The distinction may in particular be sharpened as the noise appears below and above the median value, causing its neighborhood average to tend towards the median value, whereas the real signal only has values above the median value and thus, these data points remain the current value, i.e. the real signal.

The averaged and thresholded two-dimensional signal can be summed up, resulting in a one-dimensional representation of the full bandwidth signal with enhanced signal-to-noise ratio. This means that the processing unit is adapted to calculate a summarized signal by calculating a sum of the filtered output signal over all frequencies to obtain a one-dimensional signal or output the filtered and thresholded two-dimensional signal.

A further aspect of the present invention relates to a method for monitoring an equipment, the method comprising receiving an input signal from a sensor of the equipment, the input signal being a noisy two-dimensional broad bandwidth signal, in particular a noisy two-dimensional full bandwidth signal. The method further comprises normalizing the input signal, averaging and thresholding the normalized input signal in order to reduce noise and providing the averaged and thresholded signal as a filtered output signal.

An even further aspect of the present invention relates to a computer program product comprising a computer program code which is adapted to prompt a control unit, e.g. a computer, and/or a computer of the above discussed monitoring device to perform the above discussed steps.

The computer program product may be a provided as memory device, such as a memory card, USB stick, CD-ROM, DVD and/or may be a file which may be downloaded from a server, particularly a remote server, in a network. The network may be a wireless communication network for transferring the file with the computer program product. This may also include running the method or computer program on a server, for example a virtual server in a cloud environment.

Further preferred embodiments are defined in the dependent claims as well as in the description and the figures. Thereby, elements described or shown in combination with other elements may be present alone or in combination with other elements without departing from the scope of protection.

BRIEF DESCRIPTION OF THE DRAWINGS

In the following, preferred embodiments of the invention are described in relation to the drawings, wherein the drawings are exemplarily only, and are not intended to limit the scope of protection. The scope of protection is defined by the accompanied claims, only.

The figures show:

FIG. 2: an exemplary process flow of a method for monitoring an equipment.

In the following same or similar functioning elements are indicated with the same reference numerals.

DETAILED DESCRIPTION OF SOME EMBODIMENTS

Figure 1:
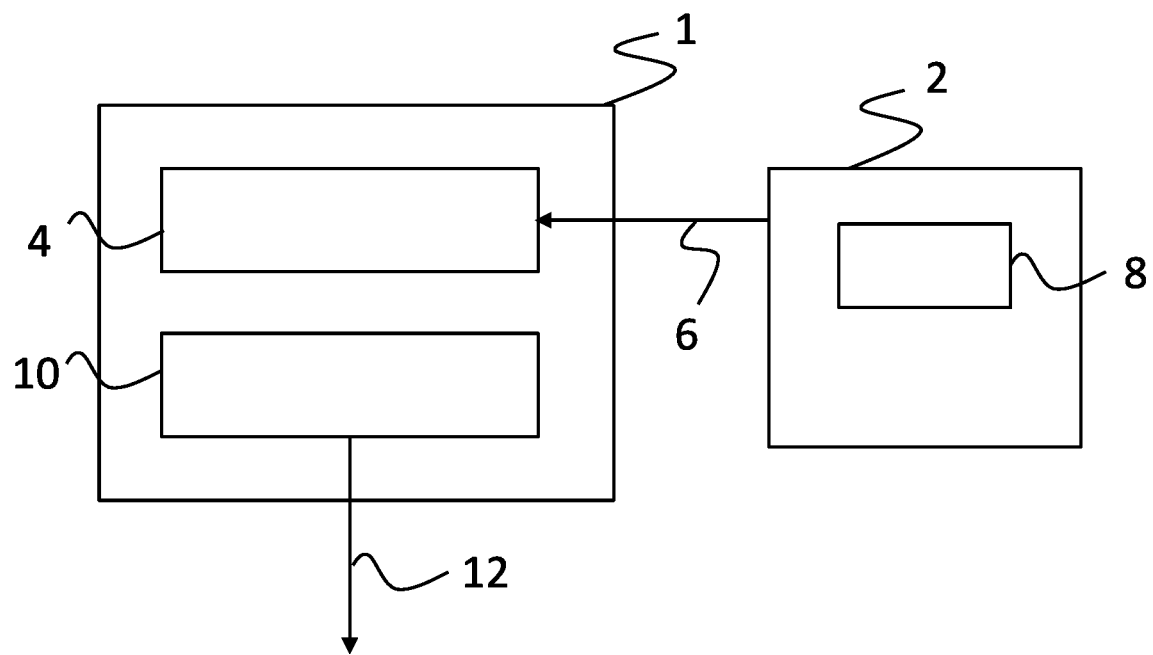
FIG. 1: a schematic block diagram of a device for monitoring an equipment.

FIG. 1 shows a device 1 for monitoring an equipment 2. The equipment 2 may be any kind of industrial, equipment, for example machines containing bearings.

In order to monitor the equipment 2, the device 1 comprises a receiving unit 4 for receiving an input signal 6 from a sensor 8 of the equipment 2. The sensor 8 may be part of the equipment 2 or may be arranged in the vicinity of the equipment 2 in order to sense for example vibrations of the equipment 2.

The input signal 6 from the sensor 8 is a noisy two-dimensional broad bandwidth signal, in particular a noisy two-dimensional full bandwidth signal. This means that the input signal 6 is a signal containing multiple frequencies for each point of time.

In order to improve the monitoring of the equipment 2, in particular by optimizing the signal-to-noise ratio of the input signal 6, the device 1 further comprises a processing unit 10 for processing the input signal 6. The processing of the input signal 6 comprises normalizing the input signal 6, averaging and thresholding the normalized input signal in order to reduce noise and providing the averaged and thresholded signal as a filtered output signal 12.

By averaging and thresholding the normalized input signal, the distinction between signal and noise may be sharpened as the noise in the averaged and thresholded signal is eliminated or at least reduced. The normalization, averaging and thresholding of the input signal 6 will be explained in greater detail with reference to FIGS. 2*a* to 2*h*.

FIGS. 2*a* to 2*h* show a schematic process flow of a method for monitoring an equipment, in particular using the device of FIG. 1.

FIG. 2*a* shows the full bandwidth noisy sensor input signal. The y-axis shows the sensor frequencies, wherein the z-axis refers to the intensity of the respective frequencies. As can be seen, the input signal 6 contains some frequencies with a high intensity (reference 14) and some noise 16. The normalization is carried out for each single frequency intensity line as shown in FIG. 2*b*.

In a first step of the normalization, each frequency line is median filtered, as shown in FIG. 2*c*, and is then normalized, for example by division by the median, as shown in FIG. 2*d*. Instead of using a median filtering, a calculation of a mean value can be carried out.

The median filtering in FIG. 2*c* separates out spikes, for example impulses, spectral peaks, etc. in the signal. The normalization in FIG. 2*d* causes centering of the intensity distribution around 1.

As shown in FIGS. 2*b* to 2*d*, the normalization is done for each frequency line independently, and, after the normalization, the signal is again processed as a full bandwidth signal. This means that the further processing of the input signal 6 is done as a two-dimensional matrix.

In FIG. 2*e*, the averaging and thresholding of the two-dimensional full bandwidth signal, which has been normalized, is shown. For each datapoint 18, the average value of the datapoint 18 as well as of the surrounding neighbor datapoints 20 is calculated. The average value can be calculated using a median filtering or can be calculated as mean value.

After the calculation of the average value, the value of each datapoint 18 may be adjusted to a new value. For example, the new value may be set to zero if the average value is below a predefined threshold value. Further, the new value may remain the current value if the average value is above or equal to the predefined threshold value.

Due to the averaging and thresholding, only pixels or datapoints 18, 20 which have a high signal-to-noise ratio are selected and thus, most of the noise has been zeroed out. This is the case as the noise appears below and above the median, causing its neighborhood average to tend towards the median value, whereas the signal only has values above the median.

As can be seen in FIG. 2f, the averaged and thresholded two-dimensional signal still contains the frequencies 14 but without the noise 16. When comparing the filtered, in particular averaged and thresholded signal, as shown in FIG. 2g, it can be clearly seen that the noise has been successfully canceled. In FIG. 2h, the original noisy one-dimensional representation of the full bandwidth signal of FIG. 2a is shown which comprises a much higher noise when compared to the filtered signal of FIG. 2g.

The filtered two-dimensional representation of the signal (FIG. 2f) can also be used for example for machine learning, in particular, for use in image recognition. For example, an automatic detection of the condition of the equipment 2 can be carried out by using such an image recognition.

The filtered signal as shown in FIG. 2f can then be summed up over the sensor bandwidth, as shown in FIG. 2g and shows some frequencies which can be used for monitoring the equipment 2. The frequencies can refer to specific conditions, for example failures or any other kind of status of the equipment. This allows an automatic recognition of defects of the equipment 2.

The herein proposed device for monitoring an equipment provides the advantage that no more setting of detection frequency bands is required so that signals cannot be missed anymore. The impulsive signal and the continuous background, i.e. the noise, can be automatically separated by using for example a large window median filtering. The frequency dependence of the input signal, for example due to the transfer function as described above, can be minimized when using this device.

The invention claimed is:

1. A system for automatically recognizing defects of an industrial equipment attributable to a bearing integrated into the industrial equipment, the system comprising:
the industrial equipment comprising the bearing, a drive, and a motor,
a sensor located on the industrial equipment and configured to monitor the bearing, the sensor generating an input signal based on any vibrational frequencies that are received, the input signal being a noisy two-dimensional full bandwidth signal containing multiple frequencies which overlap,
a processing unit is in communication with the sensor and is configured to automatically identify which of the multiple frequencies is associated with the bearing, the processing unit being configured to automatically transform the multiple frequencies into a filtered output signal which only includes data associated with the bearing, the processing unit is configured to automatically normalize each of the multiple frequencies, which represent vibrations, contained in the input signal separately for a particular property of interest, the processing unit is configured to use the particular property of interest for each of the multiple frequencies to create at least one datapoint for each of the multiple frequencies, the processing unit further automatically transforms the at least one datapoint from each of the multiple frequencies taken together by calculating an average value of each of the at least one data point and any surrounding neighbor data points to create a normalized input signal, the processing unit thresholding the normalized input signal to automatically provide the filtered output signal which correlates with the condition of the bearing, wherein the filtering by the processing unit eliminates those of the multiple frequencies and associated data points which may result from: (1) vibrations of components of the industrial equipment other than the bearing; and (2) vibrations of other industrial equipment that are included in the input signal, the filtered output signal having reduced noise and an area of no data between a plurality of peaks such that the filtered output signal only includes information for those of the multiple frequencies which are identified by the processing unit as being associated with the bearing, wherein the filtered output signal indicates allows an automatic recognition of defects of the industrial equipment attributable to the bearing, the defects being shown to one of a machine operator or an automatic equipment control system, the machine operator or the automatic equipment control system taking a corrective action for the industrial equipment based on the defects of the bearing, the corrective action being selected from the group consisting of: slowing down the operation of the industrial equipment, shutting down the industrial equipment, making adjustments to the running load of the industrial equipment or the bearing, relubricating the industrial equipment or the bearing, and replacing the defective bearing.

2. The system according to claim 1, wherein the processing unit is adapted to use the particular property of interest of intensity so as to correlate vibrational properties vs. intensity when normalizing each of the multiple frequencies.

3. The system according to claim 1, wherein, for normalizing the input signal, the processing unit is adapted to low pass filter the input signal with a moving window in the second dimension for each of the multiple frequencies and to normalize the input signal by the input signal that is low pass filtered for each of the multiple frequencies.

4. The system according to claim 3, wherein for low pass filtering the input signal, the processing unit is adapted to, as an alternative to calculating the average value, calculate a median value of each of the at least one data point and any surrounding neighbor data points to create the normalized input signal.

5. The system according to claim 1, wherein the processing unit is adapted to use the particular property of interest of temperature so as to correlate vibrational properties vs. temperature when normalizing each of the multiple frequencies.

6. The system according to claim 1, wherein the normalized input signal is set to zero if the average value is below a predefined threshold value, and wherein the normalized input signal remains the current value if the average value is above or equal to the predefined threshold value.

7. The system according to claim 6, wherein the predefined threshold value is defined according to statistical information.

8. The system according to claim 1, wherein the processing unit is adapted to calculate a summarized signal by calculating a sum of the filtered output signal over all frequencies to obtain a one-dimensional signal.

9. The system according to claim 1, wherein the processing unit is adapted to use the particular property of interest of phase so as to correlate vibrational properties vs. phase when normalizing each of the multiple frequencies.

10. The system according to claim 1, wherein the processing unit is adapted to use the particular property of interest of angle so as to correlate vibrational properties vs. angle when normalizing each of the multiple frequencies.

11. The system according to claim 1, wherein the processing unit is adapted to use the particular property of interest of speed so as to correlate vibrational properties vs. speed when normalizing each of the multiple frequencies.

12. A system for automatically recognizing defects of an industrial equipment attributable to a bearing integrated into the industrial equipment which has a neighboring industrial equipment located sufficiently proximate such that the neighboring industrial equipment can affect sensors located on the industrial equipment, the neighboring industrial equipment comprising a drive and a motor, the system comprising:
the industrial equipment comprising the bearing, a drive, and a motor;
a sensor located on the industrial equipment and configured to monitor the vibrations of the bearing, the sensor generating an input signal based on any vibrational frequencies that are received, the input signal being a noisy two-dimensional full bandwidth signal containing multiple frequencies which overlap,
a processing unit is in communication with the receiving unit and is configured to automatically identify which of the multiple frequencies is associated with the bearing, the processing unit being configured to automatically transform the multiple frequencies into a filtered output signal which only includes data associated with the bearing, the processing unit is configured to automatically normalize each of the multiple frequencies, which represent vibrations, contained in the input signal separately for a particular property of interest, the processing unit is configured to use the particular property of interest for each of the multiple frequencies to create at least one datapoint for each of the multiple frequencies;
the processing unit further automatically transforms the at least one datapoint from each of the multiple frequencies taken together by calculating an average value of each of the at least one data point and any surrounding neighbor data points to create a normalized input signal, the processing unit thresholding the normalized input signal to automatically provide the filtered output signal which correlates with the condition of the bearing, wherein the filtering by the processing unit eliminates those of the multiple frequencies and associated datapoints which may result from: (1) vibrations of components of the industrial equipment other than the bearing; and (2) vibrations of other industrial equipment that are included in the input signal, the filtered output signal having reduced noise and an area of no data between a plurality of peaks in the filtered output signal such that the filtered output signal only includes information for those of the multiple frequencies which are identified by the processing unit as being associated with the bearing;
wherein the processing unit is configured to use the at least one data point of at least one of the multiple frequencies to automatically detect whether the at least one of the multiple frequencies is generated by neighboring industrial equipment rather than from the bearing, and wherein
the filtered output signal indicates allows an automatic recognition of defects of the industrial equipment attributable to the bearing, the defects being shown to one of a machine operator or an automatic equipment control system, the machine operator or the automatic equipment control system taking a corrective action for the industrial equipment based on the defects of the bearing, the corrective action being selected from the group consisting of: slowing down the operation of the industrial equipment, shutting down the industrial equipment, making adjustments to the running load of the industrial equipment or the bearing, relubricating the industrial equipment or the bearing, and replacing the defective bearing.

13. The system according to claim 12, wherein the processing unit is adapted to use the particular property of interest of intensity so as to correlate vibrational properties vs. intensity when normalizing each of the multiple frequencies.

14. The system according to claim 12, wherein, for normalizing the input signal, the processing unit is adapted to low pass filter the input signal with a moving window in the second dimension for each of the multiple frequencies and to normalize the input signal by the input signal that is low pass filtered for each of the multiple frequencies.

15. The system according to claim 14, wherein for low pass filtering the input signal, the processing unit is adapted to, as an alternative to calculating the average value, calculate a median value of each of the at least one data point and any surrounding neighbor data points to create the normalized input signal.

16. The system according to claim 12, wherein the processing unit is adapted to use the particular property of interest of temperature so as to correlate vibrational properties vs. temperature when normalizing each of the multiple frequencies.

17. The system according to claim 16, wherein the normalized input signal is set to zero if the average value is below a predefined threshold value, and wherein the normalized input signal remains the current value if the average value is above or equal to the predefined threshold value.

18. The system according to claim 12, wherein the processing unit is adapted to calculate a summarized signal by calculating a sum of the filtered output signal over all frequencies to obtain a one-dimensional signal.

19. The system according to claim 12, wherein the processing unit is adapted to use the particular property of interest of phase so as to correlate vibrational properties vs. phase when normalizing each of the multiple frequencies.

20. The system according to claim 12, wherein the processing unit is adapted to use the particular property of interest of speed so as to correlate vibrational properties vs. speed when normalizing each of the multiple frequencies.

\* \* \* \* \*